United States Patent [19]

Dilly-Louis et al.

[11] Patent Number: 5,598,980
[45] Date of Patent: Feb. 4, 1997

[54] PROCESS FOR THE SEPARATION OF CARPET MATERIALS

[75] Inventors: Wolfgang Dilly-Louis, Friedberg; Joachim Seelig, Biebergemuend; Reinhard Wolf, Rodenbach, all of Germany

[73] Assignee: Zimmer Aktiengesellschaft, Frankfurt, Germany

[21] Appl. No.: 356,688

[22] Filed: Dec. 15, 1994

[30] Foreign Application Priority Data

May 10, 1994 [DE] Germany ............ 44 16 466.1

[51] Int. Cl.$^6$ ............ B02C 19/12
[52] U.S. Cl. ............ 241/20; 241/21; 241/24.17; 241/24.18
[58] Field of Search ............ 241/21, 29, 20, 241/24, DIG. 38, 24.17, 24.18; 521/40, 40.5

[56] References Cited

U.S. PATENT DOCUMENTS

| | | | |
|---|---|---|---|
| 5,169,870 | 12/1992 | Corbin et al. | |
| 5,197,678 | 3/1993 | Trezek et al. | 241/21 |
| 5,230,473 | 7/1993 | Hagguist et al. | 241/DIG. 38 X |
| 5,236,603 | 8/1993 | Sampson | 241/21 X |
| 5,320,450 | 6/1994 | Smith | 241/DIG. 38 X |

FOREIGN PATENT DOCUMENTS

| | | |
|---|---|---|
| 2301362 | 9/1976 | France . |
| 9401219 | 1/1994 | WIPO . |

OTHER PUBLICATIONS

Centrifugal System Provides for Waste Separation, European Plastics News, 5–93, vol. 20.

*Primary Examiner*—Mark Rosenbaum
*Attorney, Agent, or Firm*—Banner & Witcoff, Ltd.

[57] ABSTRACT

Process for separating preshredded carpet materials into as many as three main components of different densities which comprises finely comminuting the carpet materials in the liquid phase. The density of the liquid phase is adjusted to a level between two adjacent densities of the components. Separation of one component from the other components and from the liquid phase in the suspension is effected in a double-cone full-jacketed screw centrifuge. The process is repeated if there are two materials of different densities in the other components fraction. The process is useful for recovering nylon, polyester, or polypropylene from carpet scraps which nylon or polyester can be depolymerized to reusable monomers and which polypropylene can be reprocessed into pellets, non-wovens or fibers.

15 Claims, No Drawings

PROCESS FOR THE SEPARATION OF CARPET MATERIALS

This invention concerns a process for almost complete separation of used carpeting, preferably tufted nylon carpeting materials, into as many as three main components. This invention especially concerns hydrodynamic sorting of shredded carpet materials.

BACKGROUND OF THE INVENTION

When remodeling public and private facilities, large volumes of used carpeting and cuttings of new carpeting are generated and must be sent for recovery of the valuable components. However, economically feasible recycling presupposes that the carpet materials can be separated into the individual components. Thus, for example, a tufted carpet will consist essentially of pile fibers of nylon 6 or nylon 6,6 or polyethylene terephthalate or polybutylene terephthalate as well as a primary backing material or a tufting base of woven polypropylene and/or natural fibers as well as a carpet backing made of synthetic or natural rubber mixed with inorganic fillers, especially chalk-filled styrene-butadiene latex foam or a second backing of woven polypropylene or natural fibers.

It is generally known (K. R. Wolff, *Chemiefasern/Textilindustrie* [Manmade Fibers/Textile Industry], vol. 30/82 (1980), pages 500 to 506 and E 68 to E 69) that after shredding by cutting and optionally drying and precompressing, almost all types of polymer and fiber wastes of polyesters or nylons can be compacted, melted and degassed in a special extruder and then fed into a depolymerization plant. The fractions that do not melt are filtered out before depolymerization, while polymers foreign to depolymerization are not separated from the resulting monomers until after depolymerization. This results in a much greater power consumption and a demand for much larger amount of reaction volume. The quality of the foreign polymers also suffers greatly during the depolymerization reaction, thus usually preventing their reuse as plastics.

PRIOR ART

In the process according to U.S. Pat. No. 5,169,870 which is based specifically on nylon 6 carpet materials, the pre-shredded carpeting is subjected to another comminution in the dry phase by shredding, tearing or milling and is also subjected to aerogravimetric separation before compacting and melting. In this comminution in the dry phase, the thermal stress on the polymers is very great, especially in view of the long dwell time in the comminution device which is necessary in order to achieve an appropriate particle size, which thus leads to caking and consequently also leads to bonding of the various components that cannot be separated by mechanical means. Furthermore, the yield and selectivity in the separation stage tend to be unsatisfactory because of the form, the surface properties and the bonding of the material to be separated (fiber clusters, particles attached to fibers). In our experience, the yield and purity of the components, according to this disclosure, will be approximately 50 to 80 wt %, and the low purity in particular precludes direct recycling as a high-quality plastic.

It is also known from German Patent A 2,926,233 that after suspending polymer-based mixtures of substances in a suitable liquid, they can be separated into their individual components by using hydrocyclones. Since mainly turbulent flow conditions prevail in a hydrocyclone, the separation effect depends greatly on the shape, size and distribution of particles. Whereas good results are achieved with shredded polyester bottle waste, for example, fibrous wastes including carpet wastes can hardly be separated by this method.

SUMMARY OF THE INVENTION

Therefore, the purpose of the present invention is to create a physical method of separating carpeting into as many as three main components that will permit a much greater purity and yield of the components than the known processes in the dry phase or by means of a hydrocyclone.

This problem is solved according to this invention by means of the process described below. Starting with pre-shredded carpet waste, an aqueous suspension of finely shredded carpet particles is prepared in the liquid phase in a cutting mill or a similar cutting device. By adding an aqueous salt solution, the density of the liquid phase of the suspension is adjusted to a level between the densities of two main components having adjacent densities. This suspension is then sent to a double-cone full-jacketed or solid-bowl screw centrifuge where it is separated into three fractions, namely, a fraction consisting essentially of one main component and an intermediate fraction consisting essentially of the two other main components and a liquid phase. The intermediate fraction is in turn suspended in an aqueous salt solution having a defined density and separated in a double-cone full-jacketed screw centrifuge into two solids fractions consisting essentially of just one main component each and into a liquid phase. The solids fractions separated in this way are sent individually for recycling while the liquid phases are recycled within the process.

The process according to this invention is suitable for processing any types of synthetic fiber carpet materials, preferably tufted carpets made of pile fibers of nylon 6, nylon 6,6, polyethylene terephthalate or polybutylene terephthalate including low-modified copolymers and a primary backing or support fabric of polypropylene and a carpet backing of synthetic rubber mixed with inorganic fillers, usually chalk-filled styrene-butadiene rubber foam. Tufted carpets having a second backing of woven polypropylene instead of a carpet backing of foamed rubber as well as needled non woven carpeting of polypropylene felt with a backing of filled synthetic rubber can also be separated. In this case, the second separation stage is eliminated because there are only two main components.

DETAILED DESCRIPTION

The carpet materials to be separated are first mechanically pre-shredded into pieces or strips, where this measure serves only to allow the carpet materials to be fed to the downstream fine comminution device. The fine comminution takes place in a commercial cutting mill or an equivalent cutting device, where the process is carried out in the liquid phase while water and/or recycled aqueous salt solution is fed into the system in order to prevent sticking due to thermal stress. A solids concentration in the range of 5 to 50 wt %, preferably 10 to 30 wt % has proven suitable. This process permits both fine comminution under gentle thermal conditions as well as thorough wetting of the material and that the fibers will be cleaned of adhering impurities.

The particles are discharged from the fine comminution device through a perforated plate with holes having a diameter in the range of 3 to 10 mm, preferably 5 to 8 mm. Surprisingly, the chopped individual particles in the aqueous suspension are present almost in the form of a uniform material—in other words, each individual particle consists essentially either of pile fibers or the supporting fabric or the carpet backing but not combinations of these components.

The aqueous suspension is sent to a receiving tank which is equipped with a stirrer. At the same time, the solids concentration of the suspension in this receiving tank is lowered to a level in the range of 1 to 15 wt %, preferably 3 to 10 wt % and the density of the liquid phase of the suspension is adjusted to a level that is preferably between the highest and the second highest density of the main carpet components. As an alternative, the density can be adjusted at a level between the lowest and the second lowest density of the main components, as explained in greater detail below. The carpet component having the highest density is normally due to the filler, the carpet backing having a density, on the order of 2.0 kg/dm$^3$. The second heaviest component is the pile fibers having a density of about 1.35 kg/dm$^3$ for polyethylene terephthalate, about 1.31 kg/dm$^3$ in the case of polybutylene terephthalate and about 1.15 kg/dm$^3$ in the case of nylon 6 and nylon 6,6 and the needled non woven with about 0.90 kg/dm$^3$ in the case of polypropylene. Accordingly, in the preferred process, the density of the liquid phase of the suspension in the case of polyester fibers is adjusted to a value in the range of about 1.35 kg/dm$^3$ to about 1.50 kg/dm$^3$ and in the case of polyamides it is adjusted to the range of 1.16 kg/dm$^3$ to about 1.30 kg/dm$^3$ and in the case of polypropylene it is adjusted to about 1.0 kg/dm$^3$. The density in all instances herein is at 20° C.

The adjustment in the density while at the same time adjusting the solids concentration is accomplished with the help of an aqueous salt solution preferably calcium chloride or potassium carbonate, where the concentration of the salt solution is higher, the higher the density to be established and the lower the reduction to be achieved in the solids concentration. For both $CaCl_2.2H_2O$ and $K_2CO_3.1.5\ H_2O$, the density (at 20° C.) of an aqueous solution with a concentration of 30 wt % is about 1.28 kg/dm$^3$ and the density of a 40 wt % solution is about 1.4 kg/dm$^3$ and that of a 50 wt % aqueous $K_2CO_3.1.5\ H_2O$ solution is 1.54 kg/dm$^3$. Polypropylene fibers are a special case to some extent because in this case a salt concentration of 0 wt %, in other words, pure water is sufficient. Preferably the aqueous salt solution is prepared in the form of a stock solution having a defined density in a separate salt dissolving unit. Adding small amounts of less than 0.2 g/l of a commercial wetting agent and/or foam suppressant is recommended.

After successfully adjusting the density and the solids concentration, the suspension is sent to a double-cone full-jacketed screw centrifuge. With such equipment which has been available commercially for quite awhile now, it is possible to separate the solids having a higher density than the liquid phase from the solids having a lower density than the liquid phase as well as from the liquid phase itself. The two solids fractions are discharged with a residual moisture content in the range of 2 to 25 wt %, depending on the consistency of the particles.

In the preferred process described here, the heavier fraction consists of more than 90 wt % synthetic rubber mixed with mineral fillers plus small amounts of fiber material. Although the density of synthetic rubber is on the order of only about 1.0 kg/dm$^3$, because of the good distribution and the large amount of filler such as chalk having a density of about 2.7 kg/dm$^3$, the carpet backing component is heavy and comprises a large part of this material stream. After drying, this fraction can be reused in a central heating plant or it can be recycled as a filler after additional reprocessing steps.

The liquid phase which consists of the aqueous salt solution is sent back to the salt dissolving unit if necessary after increasing the concentration, depending on the salt content of the stock solution. In the latter case, the water evaporated from the salt solution is also recycled back to the process, preferably into the fine comminution unit where only the fraction discharged as residual moisture with the solids fractions need be replaced by fresh water. As an alternative, the fine comminution device may also be charged with aqueous salt solution instead of water.

The lighter solid fraction consists essentially of the two other main components and is referred to below as the intermediate fraction. This intermediate fraction is suspended in water and/or aqueous salt solution in another receiving tank and the density of the liquid phase is adjusted to a level between the densities of the two main components forming the intermediate fraction. In most cases, one of these two main components will be polypropylene whose density is about 0.90 kg/dm$^3$. In these cases, it is possible to work with a density of the liquid phase of about 1.0 kg/dm$^3$—in other words, to use water without added salt, in which case water must be added to the intermediate fraction in an amount sufficient for the solids concentration of the suspension to be in the range of 1 to 15 wt %, preferably 3 to 10 wt %. Otherwise, the density of the liquid phase is adjusted by means of an aqueous saline solution as described above.

The suspended intermediate fraction is separated into a solids fraction having a higher density than the liquid phase and a solids fraction having a lower density than the liquid phase, as well as a liquid phase, in another double-cone full-jacketed screw centrifuge. Depending on the properties of the particles, the residual moisture content of the two solids fractions is in the range of 2 to 15 wt %.

The first of these solids fractions consists of more than 95 wt % pile fibers plus small amounts of carrier fabric and carpet backing assuming a recovery of more than 90 wt %. This fraction can be sent directly to a depolymerization installation where the monomers on which the fibers are based can be recovered. Because of their small amounts, the impurities (carrier fabric and carpet backing plus adhering salt) hardly affect the depolymerization process, in particular no additional reaction volume is required, and the reaction residue is small in comparison with the processes according to the state of the art. As an alternative, this fraction can be processed in the melt phase to yield molded products after being first dried.

The other solids fraction consists of more than 95 wt % carrier fabric, usually polypropylene plus very small amounts of pile fibers and carpet backing. Since the polypropylene is not exposed to any mentionable thermal and/or chemical stress during the carpet separation process, this polypropylene, after drying, can easily be sent for recycling in the needled non woven or fiber manufacturing area or can be marketed as pellets with no problem.

The liquid phase, mostly water, is again used for suspending the intermediate fraction. Any excess can be recycled back to a preceding stage in the process.

As mentioned above, the density of the liquid phase of the aqueous suspension of the finely comminuted carpet material can also as an alternative be adjusted to a level between the lowest and the second lowest density of the main components. In most cases the main component having the lowest density will be polypropylene and the main component having the second lowest density will be the pile fibers, so in this case it is advisable for the density of the liquid phase to be about 1.0 kg/dm³. In this case, the fine comminution of the carpet material will take place with the addition of water alone which is then supplemented by more water in the receiving tank up to a solids concentration in the range of 1 to 15 wt %. In the subsequent separation by means of the double-cone full-jacketed screw centrifuge, a fraction consisting of more than 95 wt % polypropylene and an intermediate fraction consisting of the two other main components as well as a liquid phase consisting of water are obtained.

The intermediate fraction is suspended in water or aqueous saline solution as described above and the density of the liquid phase is adjusted with aqueous salt solution to an intermediate value in the range of 1.16 to about 1.30 kg/dm³ in the case of pile fibers made of nylon and in the range of about 1.35 to about 1.50 kg/dm³ in the case of polyester fibers. Then the suspension is divided by means of a double-cone full-jacketed screw centrifuge into a fraction consisting of more than 95 wt % pile fibers and a fraction consisting of more than 90 wt % carpet backing and a liquid phase consisting of the aqueous salt solution.

Recycling of the polypropylene fraction, the pile fiber fraction and the carpet backing fraction as well as recycling of the liquid phases within the process take place as described above for the preferred process.

When using the process for separating carpet materials consisting of just two main components such as tufted carpeting with a second backing or needled non woven carpeting, the step of re-suspending and separating the intermediate fraction is eliminated. In this case, a polypropylene fraction and a pile fiber fraction are obtained directly when reprocessing tufted carpets having a second backing or a carpet backing fraction in the case of needled non woven carpeting. Recycling is performed in the same way as described above.

The process according to this invention is carried out preferably continuously at ambient temperature. A discontinuous process is possible, in which case the suspension and separation of the intermediate fraction can take place in the equipment used for the preceding steps of the process, namely the receiving tank and the double-cone full-jacketed screw centrifuge.

SPECIFIC EXAMPLE

| 30.0 Kg carpeting having the following composition: | |
|---|---|
| Nylon 6 fibers | 40.0 wt % |
| Polypropylene carrier fabric | 5.0 wt % |
| Foam backing made of chalk filled styrene-butadiene latex (chalk content 62 wt %) | 55.0 wt % | was sent together with 270 kg water to a cutting mill. The perforated plate upstream from the discharge was equipped with holes measuring 6 mm in diameter.

The suspension discharged from the cutting mill was pumped into a receiving tank equipped with a stirrer and mixed there with 300 kg of an aqueous 40.0 wt % $CaCl_2 \cdot 2H_2O$ stock solution containing 0.1 g/l of a wetting agent.

Then the suspension was fed into a double-cone full-jacketed screw centrifuge. The heavier carpet backing fraction (dry 17.5 kg) was discharged having a residual moisture content of about 20 wt % and the intermediate fraction (dry 12.5 kg) was discharged with a residual moisture content of about 10 wt %.

The intermediate fraction was fed into a second receiving tank equipped with a stirrer and suspended in 255 kg water. This suspension was fed to a second double-cone full-jacketed screw centrifuge. The pile fiber fraction (dry 11.0 kg) was discharged with a residual moisture content of about 10 wt % and the carrier fabric fraction (dry 1.5 kg) was discharged with a residual moisture content of about 5 wt %.

The solid fractions thus separated had the following composition based on dry solids:

| Component | Pile Fiber Fraction | Carrier Fabric Fraction | Carpet Backing Fraction |
|---|---|---|---|
| Nylon | 96 wt % | 1 wt % | 5 wt % |
| Polypropylene | 2 wt % | 98 wt % | 1 wt % |
| Chalk-filled styrene-butadiene latex | 2 wt % | 1 wt % | 94 wt % |

We claim:

1. A process for separating preshredded carpet materials containing first, second and third carpet components of different densities comprising
   a) finely comminuting said preshredded carpet materials in a first aqueous phase to form a first suspension,
   b) adding a first aqueous salt solution to said aqueous phase of said suspension to adjust the density of the resulting second aqueous phase to a level between the density of said first component and the densities of said second and third components to form a second suspension,
   c) feeding said second suspension into a double-cone, full-jacketed screw centrifuge to separate a fraction containing said second and third components from said first component and from said second aqueous phase,
   d) suspending said fraction in a third aqueous phase to form a third suspension,
   e) adding a second aqueous salt solution to said third aqueous phase of said third suspension to adjust the density of the resulting fourth aqueous phase to a level between the densities of said second and third components to form a fourth suspension,
   f) feeding said fourth suspension into a double-cone, full-jacketed screw centrifuge to separate said second component from said third component and from said fourth aqueous phase,
   g) recycling separately said first, second and third components, and
   h) recycling said separated aqueous phases within said process.

2. A process according to claim 1, in which the aqueous phase in at least one of the steps a) and d) is water.

3. A process according to claim 1 in which the first suspension has a concentration of carpet material in the range of 5 to 50 wt % and the second and fourth suspensions have a lower concentration in the range of 1 to 15 wt % and said carpet material has a particle size that is in the range of 3 to 10 mm.

4. A process according to claim 3 in which the first suspension contains 10 to 30 wt % carpet material with a particle size in the range of 5 to 8 mm and the second and fourth suspensions contain 3 to 10 wt % carpet material having a particle size in the range of 5 to 8 min.

5. A process according to claim 1 in which said first or second aqueous salt solution contains potassium carbonate or calcium chloride and less than 0.2 g/l of a wetting agent or a foam suppressant.

6. A process according to claim 1 in which said first, second and third carpet components are of descending densities.

7. A process according to claim 6 in which said first carpet component is chalk-filled synthetic rubber, said second component is pile fibers of nylon 6 or nylon 6,6, and said third component is polypropylene, and the density of the second aqueous phase is adjusted to a value in the range of 1.16 to 1.30 kg/dm$^3$ and the density of the fourth aqueous phase is adjusted to a value of about 1.0 kg/dm3 (measured at 20° C.).

8. A process according to claim 6 in which the first component is chalk-filled synthetic rubber, said second component is pile fibers of polyethylene terephthalate or polybutylene terephthalate and said third component is polypropylene, the density of the second aqueous phase is adjusted to a value in the range of about 1.35 to 1.50 kg/dm$^3$ and the density of the fourth aqueous phase is adjusted to a value of about 1.0 kg/dm3 (measured at 20° C.).

9. A process according to claim 6 in which the first component of step g) consists of more than 90 wt % chalk-filled synthetic rubber, the third component consists of more than 95 wt % polypropylene and the second component consists of more than 95 wt % pile fibers, each based on dry solids.

10. A process according to claim 9 in which said polypropylene is processed to yield pellets, non-wovens or fibers after drying and the pile fiber is depolymerized to reusable monomers.

11. A process according to claim 1 in which said first, second and third carpet components are of increasing densities.

12. A process according to claim 11 in which said first component is polypropylene, said second component is pile fibers of nylon 6 or nylon 6,6 and said third component is chalk-filled synthetic rubber, and the density of the second aqueous phase is adjusted to a value of about 1.0 kg/dm$^3$ and the density of the fourth aqueous phase is adjusted to a value in the range of 1.16 to 1.30 kg/dm$^3$ (measured at 20° C.).

13. A process according to claim 11 in which said first component is polypropylene, said second component is pile fibers of polyethylene terephthalate or polybutylene terephthalate, and said third component is chalk-filled synthetic rubber, and the density of the second aqueous phase is adjusted to a value of about 1.0 kg/dm$^3$ and the density of the fourth aqueous phase is adjusted to a value in the range of 1.35 to 1.50 kg/dm$^3$ (measured at 20° C.).

14. A process according to claim 11 in which the first component of step g) consists of more than 95 wt % polypropylene, the third component consists of more than 90 wt % chalk-filled synthetic rubber and the second component consists of more than 95 wt % pile fibers, each based on dry solids.

15. A process according to claim 14 in which said polypropylene is processed to yield pellets, non-wovens or fibers after drying, and the pile fiber is depolymerized to reusable monomers.

* * * * *